March 16, 1971 — D. E. ROGERS — 3,570,331
POWER WRENCH
Filed April 12, 1968
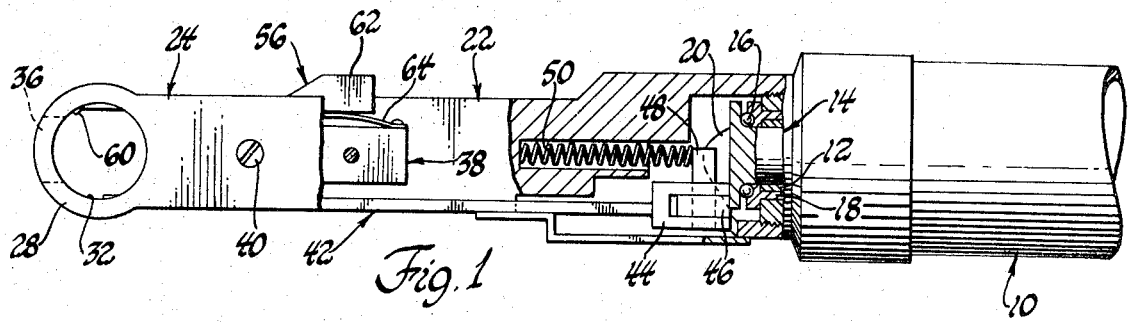
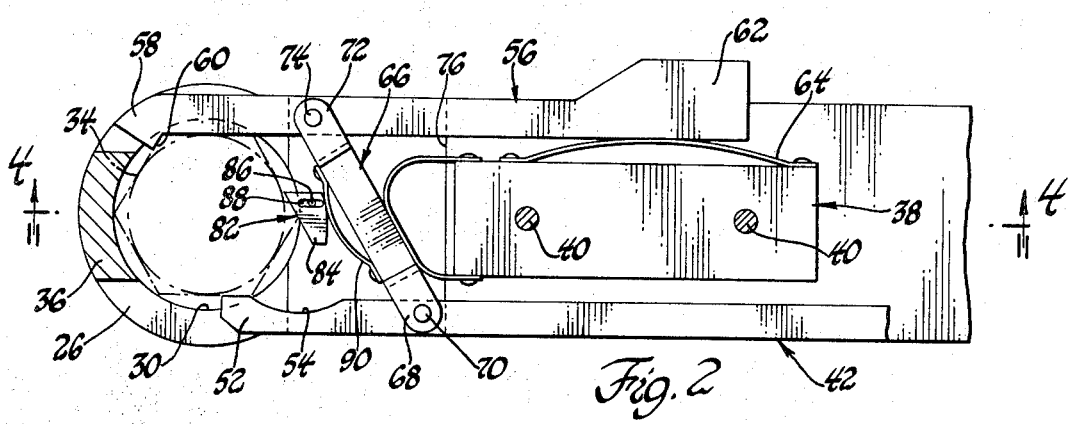
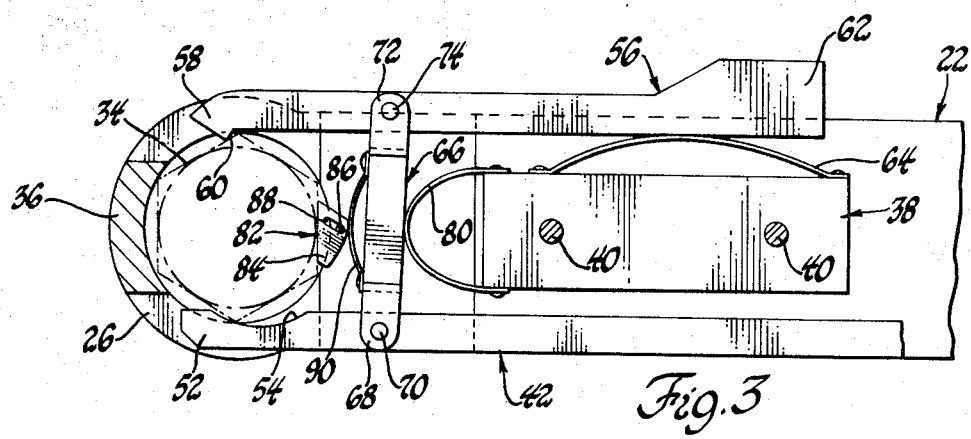
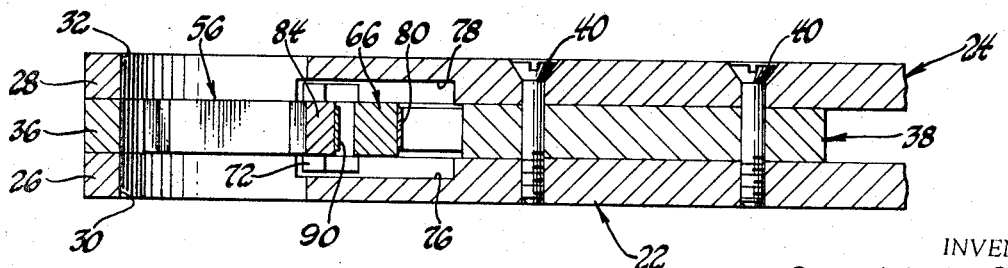
INVENTOR.
Donald E. Rogers
BY
George A. Schmidt
ATTORNEY

United States Patent Office 3,570,331
Patented Mar. 16, 1971

---

3,570,331
POWER WRENCH
Donald E. Rogers, 975 Fairfax,
Birmingham, Mich. 48009
Filed Apr. 12, 1968, Ser. No. 720,877
Int. Cl. B25b *21/02, 13/00*
U.S. Cl. 81—54                6 Claims

ABSTRACT OF THE DISCLOSURE

An improvement in power wrenches for rotating a polygonal member, such as a nut or a bolt. Power means, in the form of an air motor or the like, support spaced and parallel plate members extending from the power means and having aligned apertures in the outward ends thereof. The power means are operable to rotate a cam member. A pull rod, disposed between the plate members, carries a cam follower which engages the cam member. Rotation of the cam member causes straight line movement of the pull rod between the plate members. One side of the nut or bolt, received in the aligned apertures in the plate members, is engaged by the end of the push rod. A pull rod, also disposed between the plate members, engages the opposite side of the nut or bolt and is connected to the push rod by a transverse link. As the push rod is moved in one direction, the link causes the pull rod to move in the opposite direction, thus clamping the nut or bolt between the push rod and the pull rod and causing rotation thereof. As the push rod is moved in the opposite direction, the pull rod, through the link, is returned to its original position.

---

This invention relates to power wrenches, and more particularly to a power wrench having connected push and pull members adapted to engage opposite sides of a polygonal nut, bolt or the like, such that reciprocation of the members causes rotation of the polygonal member.

In the design and manufacture of numerous machine elements it is necessary to hold parts together by means of nut and bolt assemblies and the like. When manufacturing such elements on a production basis, it is often desirable to have some kind of power operated means for assembling the nut and bolt members in a rapid and accurate fashion. This is usually accomplished by means of a power driven device, received over either the nut or the bolt, and operated to rotate the member and thus secure the assembly.

Numerous power wrenches have been known in the past which are operable to accomplish such a result. These devices take many shapes and forms, include various different kinds of operating means, and have varying degrees of ease of operation and manufacture. A typical such device known in the art includes a sleeve or socket member having an inner configuration substantially the same as that of the polygonal surface of the nut or bolt, and is provided with an annulus of ratchet teeth on the outer surface of the sleeve. Suitable drive means are provided to rotate the sleeve member by means of the ratchet teeth, thereby driving the nut or bolt relative to the opposite member.

Most of the known power wrench devices are complicated and cumbersome affairs that are expensive to manufacture, since they must be manufactured to great precision and utilize a large number of parts. The operating members of such devices normally wear rapidly, requiring repair and/or replacement of the various parts after use for a short period of time. The precision required of the socket member normally associated with such devices makes it difficult to accommodate variations in size of the driven member due to manufacturing tolerances and the like. In addition, a degree of skill is necessary on the part of the operator to properly locate the known power wrenches in the members to be driven, thus requiring valuable time to be expended when driving such parts on an assembly line basis. When proper care is not taken by the operator, damage to the tool or to the fastening assembly is often encountered. The result is an expensive device requiring constant maintenance, replacement and repair of the various parts, and requiring skilled operators to use the devices.

The device in which this invention is embodied comprises, generally, a power wrench assembly utilizing a suitable power means, such as an air motor, with a cam device for translating the rotational movement of the motor to a reciprocal movement for a push rod, suitably mounted between spaced and parallel plates extending from the housing of the power means. The end of the push rod member is adapted to engage a surface of the nut or bolt, disposed in aligned apertures in the outward ends of the plate members. A pull rod, also disposed between the plate members, engages an opposite surface of the nut or bolt, and is connected to the push rod by a transverse link. As the air motor is operated, the rotational movement is translated to a reciprocal movement for the push rod, such reciprocal movement being translated to the pull rod by the transverse link. Reciprocation of the members while in engagement with the nut or bolt causes rotation of the nut or bolt, thus tightening the device on the opposite member. Suitable springs maintain constant engagement of the parts for continued operation.

Such a device is relatively simple to manufacture and assemble, and contains relatively few moving parts. The construction of the device is such that the various parts need not be manufactured to a great degree of precision, thus eliminating a great deal of the cost in manufacturing the device. Mounting of the device on the nut or bolt is easily and rapidly accomplished, thus eliminating the loss of time otherwise found. Engagement of the push and pull rods in the nut or bolt need not be exact in location upon initial mounting, as reciprocation of the members will quickly establish the proper driving relationship. The overall result is an economical and efficient power wrench device which is positive and simple in its operation and is readily adaptable to varying tolerances in the nut or bolt assemblies with which it is used.

These and other advantages will become more apparent from the following description, used to illustrate a preferred embodiment of the invention when taken with the accompanying drawing in which:

FIG. 1 is a plan view, with parts broken away and in section, of a power wrench embodying the invention;

FIG. 2 is an enlarged plan view of the structure shown in FIG. 1, with parts broken away and in section, illustrating the position of the various parts in one condition of operation;

FIG. 3 is an enlarged view similar to FIG. 2, illustrating the parts in another position of operation; and FIG. 4 is a cross-sectional elevational view of a portion of the structure illustrated in FIGS. 1–3, taken substantially along the line 4—4 of FIG. 2 and looking in the direction of the arrows.

Referring more particularly to the drawing, where the showings are for the purpose of illustrating a preferred embodiment of the invention only, and not for the purpose of limiting same, FIG. 1 best illustrates the overall construction of the power wrench structure. An air motor, indicated generally by the numeral 10, is of any well known type in which air under pressure causes an output shaft to rotate at a desired speed. It is to be understood at the outset that the driving means for the power wrench need not be an air motor, but may be any other suitable driving means, such as an electric motor or the like. It is only desirable that the output from the power means be a rotational motion and at suitable speed and with suitable driving power to operate the remainder of the structure in the intended manner.

Air motor 10 has an output shaft 12 to which is secured for rotation therewith a cam member, indicated generally by the numeral 14. A suitable bearing assembly 16 supports the cam member 14 on the air motor housing 18 for free rotation of the cam member 14 about the axis of the output shaft 12. On the outward face of the cam member 14 is a cam surface 20, the purpose and configuration of which will become hereinafter more apparent.

Secured to the housing 18 of the air motor 10 are a pair of spaced and parallel plate members, indicated generally by the numerals 22 and 24. Each plate member terminates at its outward end in an enlargement, 26 and 28 respectively, and each such enlargement is provided with an aperture, 30 and 32 respectively, of sufficient size and properly aligned to define a socket to receive a nut or bolt member, indicated by dashed and dotted lines 34. A suitable spacer block 36 is disposed between the plate members 22 and 24 at the outward ends to hold the plate members a suitable distance apart. At the same time, the spacer block 36 provides a surface against which the nut or bolt member 34 may be aligned with the apertures 30 and 32.

Disposed between the plate members 22 and 24, and generally centrally thereof, is a spacer block or abutment, indicated generally by the numeral 38, to maintain and support the plate members 22 and 24 a suitable distance apart, for purposes to become hereinafter more apparent. The entire assembly, including the plate members 22 and 24 and the spacer block 38, is held together by means of bolts or the like 40, suitably received in the respective plate members and through the spacer block.

Disposed between the plate members 22 and 24 and adjacent one side thereof, is a push rod, indicated generally by the numeral 42. Push rod 42 is provided with a yoke portion 44 at the end thereof adjacent the air motor 10, the yoke portion receiving a cam follower 46 rotatably mounted in the yoke portion 44 by means of a pin or shaft 48. Cam follower 46 engages the cam face 20 on the cam member 14, and the cam face configuration is such that is the cam member 13 rotates the push rod 42 will be forced to reciprocate in its longitudinal direction between the plate members 22 and 24. The cam follower 46 is maintained in contact with the cam face 20 by means of a suitable spring 50 mounted in any convenient manner in the plate structures and engaging an outwardly extending end of the pivot shaft 48. The opposite end of the push rod 42 is adapted to engage a surface of the nut or bolt 34 received in the apertures 30 and 32 in the plate members 22 and 24. An arcuate relief 54 is provided in the end 52 of the push rod 42 to accommodate the rotation of the nut or bolt member 34, as best illustrated in FIG. 3. It is desirable that the arcuate relief 54 be of such dimension as to maintain frictional engagement with the nut or bolt member 34 during complete movement of the push rod 42 and rotation of the driven member 34, as will be hereinafter more particularly described.

Also disposed between the plate members 22 and 24, and at the opposite side thereof from the push rod 42, is a pull rod, indicated generally by the numeral 56. The outward end 58 of the pull rod 56 is provided with a hook portion 60, adapted to engage a corner of the nut or bolt member 34 when in the beginning position, and overlying a portion of the aligned apertures 30 and 32. To permit mounting the structure on the nut or bolt member 34, the rearward end of the pull rod 56 is provided with an enlargement 62 which engages a spring 64 conveniently mounted on the spacer block 38. It will be apparent that depression of the enlargement 62 against the spring 64 will clear the outward end 58 from overlying the apertures 30 and 32 and interferring with the nut or bolt member 34.

Movement of the pull rod 56 is accomplished by means of motion transmitting means in the form of a link member, indicated generally by the numeral 66, pivotally secured at one end 68 to the push rod 42 by a pivot pin 70, and pivotally secured at the other end 72 to the pull rod 56 by a pivot pin 74. The pivotal connections may be made in any convenient manner, and for purposes of illustration the link 66 is shown to have yoke ends which straddle the push rod 42 and pull rod 56 at the pivotal connections. In order to accommodate such yoke ends, the under surfaces of the plate members 22 and 24 are transversally relieved, as at 76 and 78 respectively, to permit clearance for the additional width of the yoke ends 68 and 72. Link 66 is biased into a forward position by means of a spring 80, mounted in any convenient manner on the spacer block 38 and extending forwardly thereof to engagement with the link 66. The usual motion of the link 66, as the push rod 42 is reciprocated, is to rock about the spring 80, thus causing the pull rod 56 to reciprocate in coordination with the push rod 42.

In order to prevent retrograde movement of the nut or bolt member 34 after a portion of a revolution in response to the reciprocating action of the push rod 42 and the pull rod 56, a return stop means or abutment, indicated generally by the numeral 82, is provided. The stop means includes a block portion 84, having a surface adapted to engage the adjacent face of the nut or bolt member 34. A pin 86 is secured on one or both of the plate members 22 and 24 and is received in a slot 88 formed in the block 84. The block is biased against the nut or bolt member 34 by means of a spring 90, suitably secured to the forward edge of the link member 66.

The operation of the device will now be described. Assuming that the nut or bolt member 34 is to be tightened, by rotation in a clockwise direction as viewed in the drawing, the plate members 22 and 24 are inserted over the nut or bolt member 34 after depressing the enlargement 62 of the pull rod 56 against its spring 64. The spacer portion 36 aids in guiding the nut or bolt member 34 into the apertures 30 and 32, to maintain the nut or bolt member in proper position. Upon releasing the enlargement 62 of the pull rod 56, the forward end 58 engages the nut or bolt member 34 with the hook portion 60 in engagement with one of the corners between the faces. The push rod 42 is positioned adjacent an opposite face, as illustrated in FIG. 2. Actuation of the air motor 10, by any suitable control, causes rotation of the cam member 14 and a forward reciprocation of the push rod 42 by virtue of movement of cam follower 46 on the cam face 20. The link 66 causes a reverse movement of the pull rod 56 and the outward bias of the spring 64 maintains the end 58 of the pull rod 56 in engagement with the nut or bolt 34. As the push rod moves toward the left and the pull rod moves toward the right, as viewed in the drawing, the nut or bolt member 34 will be caused to rotate in a clockwise direction. The return stop means permits such rotation, and when a complete movement of the push rod 42 in one direction, as toward the left, is accomplished, and the push rod is allowed to return to its original position by means of the cam face 20 and the spring 50, the return stop means 82 will prevent counter-clockwise movement of the nut or bolt member 34. Thus, the parts may return to the original position, such as is illustrated in FIG. 2. The cycle is repeated as many times as is necessary to tighten the nut or bolt member 34.

It will be apparent that to utilize the device for loosening a nut or bolt member, it is only necessary to reverse the device so that the push rod 42 is located at the opposite side of the nut or bolt member 34, and the pull rod is likewise at the opposite side. Actuation of the power means 10 will thus cause rotation in a counter-clockwise direction to loosen the nut and bolt assembly.

Thus, a power wrench construction is provided which is positive in its operation and simple in its manufacture and construction. The relatively few parts are easily assembled and installed, do not require a great amount of precision in their manufacture and are easily replaced, if and when repair or replacement is necessary. The construction is such that variations in size of the nut or bolt member, due to manufacturing tolerances and the like, are easily accommodated. The overall result is an efficient and economical wrench construction having wide adaptability to various sizes, shapes and kinds of nut and bolt assemblies.

The present invention has been described in connection with certain structural embodiments; however, it is to be appreciated that various changes may be made in the structural embodiments without departing from the intended spirit and scope of the present invention as defined by the appended claims.

Having thus described the invention, I claim:

1. A power wrench for turning a polygonal member and comprising: power means; parallel and spaced plate members extending from said power means and having aligned apertures therein for receiving said polygonal member; a push rod extending from said power means and operably connected thereto for reciprocation thereby, said push rod being disposed between said plate members and adapted to engage a surface of said polygonal member in said apertures; a pull rod reciprocably mounted between said plate members and adapted to engage said polygonal member mounted in said apertures; a link extending transversely of said plate members and therebetween, said link being secured at opposite ends thereof to said push rod and to said pull rod to cause reciprocal movement of said pull rod with reciprocal movement of said push rod; return stop means disposed between said plate members and operable to resist reverse rotation of said polygonal member in said apertures in said plate members; first spring means disposed between said plate members and engaging said link for biasing said link toward said apertures, and second spring means mounted on said link and engaging said return stop means for biasing said return stop means against said polygonal member in said apertures in said plate members.

2. A tool for rotating fasteners comprising: means defining a socket for receiving a fastener; fastener engaging means in said socket adjustable for engaging fasteners of varying sizes; said fastener engaging means being movable to rotate the fastener in the socket, said fastener engaging means comprising a pair of members adjustable toward and away from each other in said socket for engaging a fastener between said members; means interconnecting said members such that movement of one member in a tangential path relative to the fastener causes movement of the other member in the opposite direction in a tangential path relative to the fastener to thereby cause rotation of the fastener, said members each comprises a rod reciprocable along one of said tangential paths; said means interconnecting said members comprises a link pivotally interconnecting said rods; means restraining said link to rotate in response to movement of one of said rods along its tangential path and cause movement of the other of said rods in the opposite direction along its tangential path, said means restraining said link including a pair of abutments, one located on each side of said link between said rods; a pair of springs, one engaged between one of said abutments and one side of said link and the other engaged between the other of said abutments and the other side of said link; one of said abutments comprising a stop member engageable by the fastener to prevent retrograde movement of the fastener, said stop member being mounted for adjustable sliding movement in a radial direction with respect to the socket; said springs being mounted on one side of said link and engaging said stop member to bias the stop member toward engagement with a fastener, the other of said springs being mounted on the other of said abutments and engaging the other side of said link, and said one spring comprising an arcuate leaf spring having its ends secured to said link with its arcuate portion projecting from the link into engagement with said stop member.

3. A tool for rotating fasteners comprising: a housing having a fastener receiving socket; a drive rod mounted in said housing for reciprocable movement, said drive rod having a fastener engaging portion on one end received in said socket for engaging a fastener and moving in a tangential path relative to the fastener upon reciprocation of said drive rod; a link having one end pivotally connected with said drive rod intermediate the ends thereof; a driven rod pivotally connected intermediate its ends with the other end of said link, said driven rod having a fastener engaging portion on one end receivable in said socket; resilient means engaging said driven rod on the opposite side of said link from said one end of said driven rod to resiliently bias the fastener engaging portion of said driven rod into the socket toward the fastener engaging portion of said drive rod, the fastener engaging portion of said driven rod being movable away from the fastener engaging portion of said drive rod against the resilient means to increase the space between the fastener engaging portions of said rods to permit said fastener engaging portions to accept fasteners of varying sizes, and means restraining said link to cause movement of said driven rod in response to movement of said drive rod in the opposite direction of said drive rod to cause the fastener engaging portion of said driven rod to move in a tangential path relative to a fastener received in said socket.

4. A tool for rotating fasteners comprising: a housing having a socket defined therein for receiving fasteners of varying sizes; a pair of rods mounted in said housing for reciprocable movement and each having fastener engaging end portion projecting into said socket; motion transmitting means pivotally connecting said rods together to cause movement of one of the rods in response to movement of the other rod and in the opposite direction from said other rod and permitting the fastener engaging end portions of said rods to move toward and away from each other upon pivotal movement of said rods relative to each other about said motion transmitting means; means in said housing engaging one of the rods operable to urge said one rod to a position about said motion transmitting means in which the fastener engaging end portion thereof projects into said socket to a position providing a minimum spacing between said fastener engaging end portions but permitting the fastener engaging end portion of said one rod to be moved from the position of minimum spacing to increase the spacing between said fastener engaging end portions to permit the fastener engaging end portions to accept fasteners having larger dimensions than provided by the minimum spacing; a return stop means mounted in said housing for movement toward and away from the center of said socket; means engaging said stop means operable to urge said stop means to project into said socket between the fastener engaging end portions of said rods to a position corresponding to the minimum spacing between said fastener engaging end portions and operable to permit the stop means to retract to permit a fastener having larger dimensions than provided by the minimum spacing to be received in the socket, said stop means engaging fasteners received in said socket between said fastener engaging end portions to prevent retrograde movement of the fastener as the fastener is rotated by movement of said fastener engaging end portions in response to reciprocation of said rods; the fastener engaging portion of one of said members comprising a hook portion for engaging the corner of a polygonal fastener, and the fastener engaging portion of the other rod having a flat surface on the outer end for engaging the flat surface of a polygonal fastener, and an arcuate relief extending inwardly of said flat surface for accommodating rotation of a fastener during reciprocation of said other rod.

5. A tool as claimed in claim 2 wherein said other spring comprises an arcuate leaf spring having its ends mounted on the other of said abutments with its arcuate portion projecting therefrom into engagement with said link.

6. A tool as claimed in claim 5 further including a third spring on said other abutment engaging one of said rods and biasing said one rod to pivot about its pivotal connection with said link such that the portion of said one rod on the opposite side of said link is biased toward the portion of the other rod on the same side of said link.

References Cited

UNITED STATES PATENTS

| | | | |
|---|---|---|---|
| 2,264,012 | 11/1941 | Wasson | 81—54 |
| 3,270,596 | 9/1966 | Hall et al. | 81—54 |
| 3,386,319 | 6/1968 | Bloom | 81—58.1 |

JAMES L. JONES, JR., Primary Examiner

U.S. Cl. X.R.

81—57.39, 57.46